United States Patent [19]

Wolf et al.

[11] Patent Number: 5,004,888

[45] Date of Patent: Apr. 2, 1991

[54] PLASMA TORCH WITH EXTENDED LIFE ELECTRODES

[75] Inventors: Charles B. Wolf, Irwin; Shyam V. Dighe, North Huntingdon; Paul E. Martin, West Mifflin; Raymond F. Taylor, Jr., Penn Township; William J. Melilli, Belle Vernon, all of Pa.

[73] Assignee: Westinghouse Electric Corp., Pittsburgh, Pa.

[21] Appl. No.: 454,495

[22] Filed: Dec. 21, 1989

[51] Int. Cl.[5] .......... B23K 9/00

[52] U.S. Cl. .......... 219/121.520; 219/121.48; 219/121.59; 219/121.5; 219/119

[58] Field of Search .......... 219/121.52, 121.48, 219/121.38, 121.5, 119, 118, 74, 75, 121.59

[56] References Cited

U.S. PATENT DOCUMENTS

| | | | |
|---|---|---|---|
| 3,525,848 | 8/1970 | Bugaj | 219/119 |
| 3,705,975 | 12/1972 | Wolf et al. | 219/121.36 |
| 3,790,742 | 2/1974 | Aver | 219/121.52 |
| 4,214,736 | 7/1980 | Wolf et al. | 219/121.52 |
| 4,345,136 | 8/1982 | Nippert | 219/120 |
| 4,853,515 | 8/1989 | Willen et al. | 219/121.52 |

FOREIGN PATENT DOCUMENTS

| | | | |
|---|---|---|---|
| 0174284 | 10/1984 | Japan | 219/119 |

OTHER PUBLICATIONS

C. B. Holden, "Electrode Life in an Oxygen Arc Heater", date approx. 1985.

*Primary Examiner*—M. H. Paschall
*Attorney, Agent, or Firm*—G. H. Telfer

[57] ABSTRACT

A plasma torch electrode has a copper outer shell on an inner portion of which is provided a more durable composition of a silver alloy by pressing or casting to achieve longer lifetime under arcing conditions in air or oxygen while minimizing the cost of materials and fabrication.

20 Claims, 3 Drawing Sheets

PLASMA TORCH WITH EXTENDED LIFE ELECTRODES

BACKGROUND AND SUMMARY OF THE INVENTION

This invention relates to plasma torches such as for heating a gas and particularly to plasma torch electrodes, their composition, and methods of manufacture.

Plasma torches to be improved by the present invention typically contain two tubular shaped, water cooled, electrodes colinearly arranged along an axis. In direct current operation, one electrode is at a high potential and the other is normally at ground potential. There is a small gap, typically about 1 mm, between adjacent ends of the electrodes where an arc is initiated during startup. Gas to be heated is forced through this small gap into the inside of the tubular electrodes, thereby causing the arc to be extended into their inside diameter. Field coils surrounding the electrodes cause the arc to rotate within the electrode bores at a high velocity. The cold gas, coming through the small gap and then through the rapidly moving arc, is thus heated by the arc.

One electrode is referred to as the upstream electrode and normally has a closed end and is normally the electrode to which a high potential is applied. The other electrode, at ground potential, has an open end from which the heated gas passes and is referred to as the downstream electrode. The heated gas may be utilized for any number of heating purposes including chemical processes such as ore reduction.

Further background on relevant torches may be found in U.S. Pat. Nos. 3,705,975 and 4,214,736, whose description as to the construction and manner of operation of plasma torches is incorporated herein by reference.

Electrode life, particularly at the upstream, high voltage electrode, is a concern with the foregoing and similar torch designs, particularly when operating with an oxidizing gas such as air as the torch gas with copper electrodes.

As a consequence, a limited life of the electrodes for a given power level and torch size has limited the use of torches in commercial applications.

Another important factor is that in most industrial torch applications, the replacement of worn electrodes results in significant lost operating time for the process. Hence, longer lasting electrodes are desirable even with somewhat added cost for such electrodes.

During normal direct current operation on copper electrodes with the upstream electrode being the anode, the life of the upstream electrode may be less than about 100 hours and the life of the downstream electrode may be less than 300 hours. Oxide particles coming from the upstream electrodes tend to cause unstable torch operation. Copper oxide is stable at high temperature. These small particles enter the gap between electrodes, causing periodic short circuits and damage to the gap area. Reversing the polarity does not avoid the problem. Torch operation on alternating current alleviates the gap shorting problem somewhat but the electrode life of the two electrodes is merely made substantially equal at about 200 hours or less.

While copper has been the commonly used electrode material (typically OFHC copper with purity greater than 99%), exhibiting the above-mentioned wear problems, some longer life torch electrodes have been made of silver and copper alloys in the range of 72% to 90% silver. While the use of electrodes of such a composition has been found favorable in terms of lifetime when operating on air or oxygen, the expense of the electrodes has prohibited very widespread use. The relatively high cost results both from the cost of the silver electrode material itself as well as from the required fabrication operations.

Some electrodes in small torches made by Westinghouse have consisted entirely of a silver-copper alloy of the eutectic composition of 72% silver-28% copper. The electrodes were made by extruding the material from a rod. In other work reported by C. B. Holden of PPG Industries, Inc. in a paper "Electrode Life in An Arc Heater" (publication citation not known), life problems of electrodes are reported and discussion of the characteristics of silver alloy electrodes is given. The 72%-28% silver-copper alloy was recommended; certain commercial arc heater electrodes were made of the 80%-20% silver-copper alloy. Both the anode and cathode had a copper ring brazed onto one end to permit a threaded connection. Also, it is reported that a step joint and silver solder were used to fit deteriorated electrodes with new noses to replace the damaged area of the same 80%-20% alloy. In the case of some rear electrodes, this joint technique is also reported to have been used using a length of silver alloy tubing where the arc attachment was expected and copper tubing at both ends. The silver alloy tubing used for these electrodes was of cast material. It is mentioned that at the end of their lifetime of 5,000-10,000 hours (with an arc drawing about 550 amperes), they could be repaired with a new section of silver alloy tubing replacing the eroded part, giving even greater length of useful life.

The foregoing results in considerable material cost and, also, concern about the integrity of soldered joints which are required to be water tight. In some torches of particular current interest, the current drawn is in the range from about 1000-2000 amperes which aggravates the problem of electrode life.

In general, silver electrode material is typically more expensive than copper by a factor of about 30. Further, the fabrication of silver into the shape required for manufacturing electrodes might double this unfavorable ratio. Actual test data measuring wear on an anode indicates electrode life extended by factors of about 7 to 10 times in the high wear region of the electrode surface when using silver alloy material as compared to copper. An objective of the present invention is to provide designs for electrodes and their fabrication that are sufficiently economical so that the cost disadvantage does not greatly offset the improvement in life time.

In accordance with the present invention, a torch electrode comprises a tubular outer shell of a first material such as copper. On the inner surface of the outer shell, or preferably merely a portion of the inner surface, is directly fabricated an arcing portion of a second, more durable, metal such as silver-copper alloy. The second metal is provided, at least, in the region where the arc normally attaches to the electrode surface under the operating conditions to be encountered. In one method a silver alloy powder is compacted onto the shell by a hot isostatic pressing process. In another method, the silver alloy in the form of a powder or other form such as a wire can be placed in a cavity between the shell and a liner and then melted in a furnace to form a cast layer of alloy in the proper location.

By such techniques, the occurrence of the silver alloy can be minimized both in axial extent as well as in thickness. A silver alloy thickness of no greater than about 6 mm, on the copper outer shell, is sufficient to provide a lifetime extension of about 7–10 times as compared to copper with an economical cost. The silver alloy thickness is generally no more than about half of the total electrode thickness. This is to extend life with lower material cost. A complete electrode, or complete thickness of silver alloy provides only a marginally greater improvement in life but at a considerably greater cost. While significant advantage can be taken of such electrodes as provided in a unitary integral structure, it is also a suitable design to provide the copper shell in detachable sections, as by having threaded ends, with the use of O-ring seals as desired, in order to permit replacement of only a section of the shell when the section having the arcing portion becomes worn.

THE DRAWINGS

PREFERRED EMBODIMENT

Figure 1:
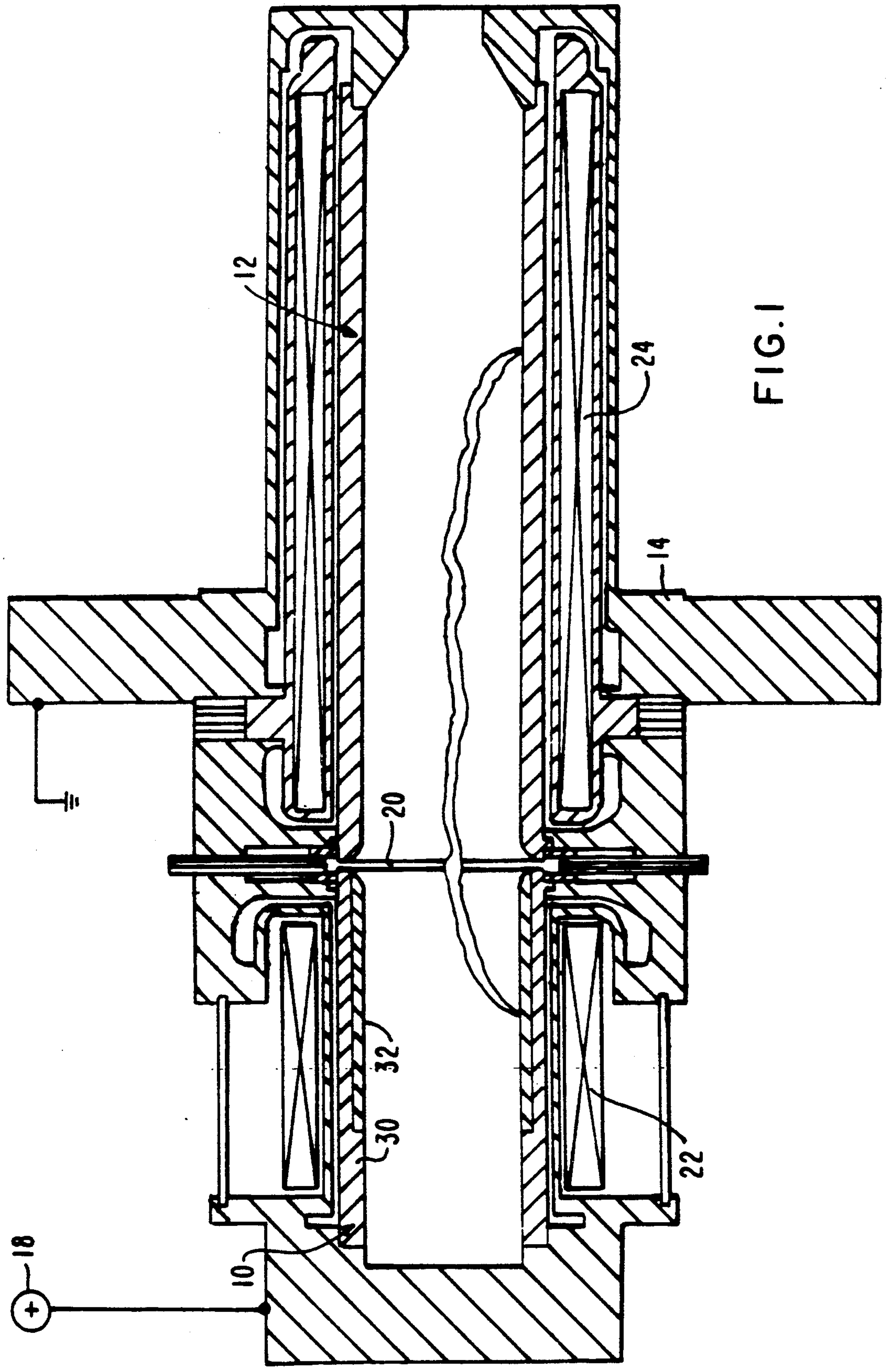
FIG. 1 is a general view of a plasma torch improved in accordance with the present invention by one embodiment.

As shown in FIG. 1, a plasma torch in accordance with the present invention typically contains two tubular shaped electrodes 10 and 12 colinearly arranged along an axis. The electrodes are provided with water cooling equipment 14 on their outer surface (not detailed herein). One electrode 10 has a closed end 16 and is referred to as the upstream electrode; it is normally operated at a high positive potential relative to the downstream, open ended electrode 12 that is normally at ground potential; power being supplied by a power supply means 18. There is a small gap 20, typically about 1 mm, between adjacent ends of the electrodes where an arc is initiated during startup when the electrodes are energized by the power supply. Gas to be heated, supplied from a gas source (not shown) is forced through this small gap into the inside diameter of the electrodes, causing the arc to be extended into the electrode inner space. Field 22 and 24 coils surrounding the respective electrodes cause the arc to rotate within the electrode bores at high velocities. The cold gas, coming through the small gap and then through the rapidly moving arc, is thus heated by the arc. The gas continues out of the bore of the downstream electrode (to the right in the FIGURE) where it can be utilized for any process. Further information with respect to the construction and operation of the basic torch is well known, such as in above-mentioned U.S. Pat. No. 3,705,975.

By the present invention the high voltage electrode 10 has an outer shell 30 of a first conductive material, such as copper, that extends the axial length of the electrode and an inner arcing portion 32 of a second conductive material such as silver or a silver copper alloy that is more durable in the gas with which the torch is operated. The arcing portion 32 may be confined to a region of the electrode that is most affected by the arc under the operating conditions of the torch. Furthermore, the thickness of the second material in the arcing portion may be limited to a thickness of no more than about half the electrode thickness, such as about 6 mm. Thus, the quantity of the second material as compared to that of the less expensive, first material is considerably less.

The invention may also be practiced in torches in which both of the two electrodes have the construction employing the limited surface area arcing portion 32 in accordance with this invention. This would be desirable when operating on alternating current, for example.

The outer shell 30 is principally of copper as fabricated substantially in accordance with prior practice for plasma torch electrodes. The inner, arcing portion 32 of the second, more durable, metal may be any of a Wide range of compositions including silver and silver alloys when operating in air. Among the suitable compositions are silver-copper alloys ranging from the eutectic of 72% silver-28% copper, by weight, to about 80% silver-20% copper. In part, the composition selection is dependent upon the particular method of fabrication chosen as will be explained further hereinafter. Any such compositions may contain additional constituents, such as tungsten, to provide even longer wear in air.

Figure 2:
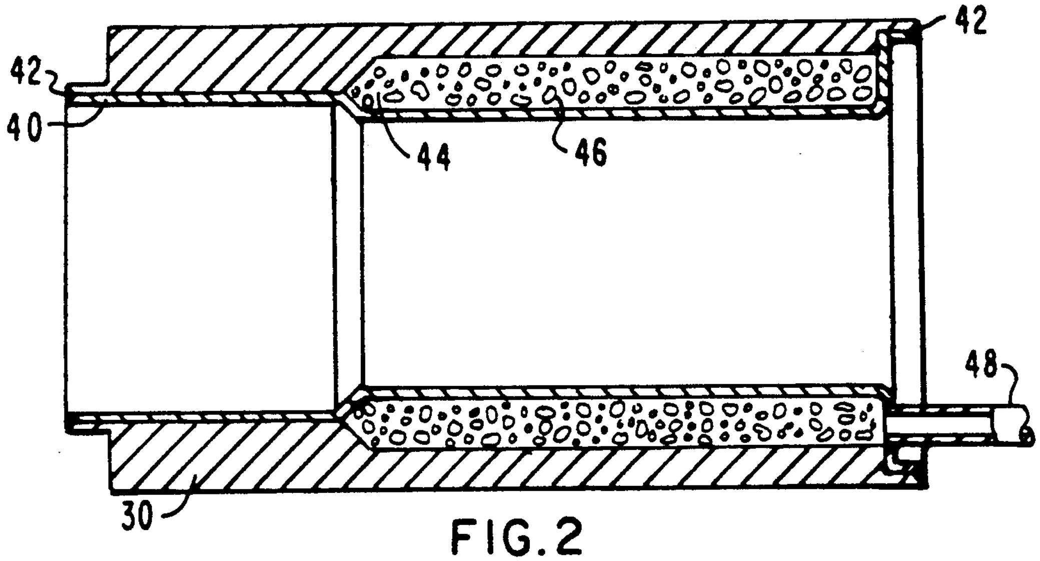
FIG. 2 is a cross-sectional view of an embodiment of the present invention at a preliminary stage in its fabrication.

FIG. 2 shows one fabrication technique for the improved electrode. The outer shell 30 is arranged with an inner liner tube 40, which, for example, is of copper having a thickness of only about 2 mm. The liner tube 40 is joined to the outer shell by weld joints 42 at their respective ends. The outer shell and liner tube are configured so as to provide an accessible volume 44 therebetween. In the example of FIG. 2, the outer shell is recessed from its maximum thickness in the area where the arcing portion is to be fabricated and the liner tube is of more restricted inner diameter in that portion of the structure. After assembly of the liner tube, the volume 44 between the outer shell and the liner tube is filled with alloy metal for the arcing portion. In FIG. 2, the space is filled with an alloy powder 46 of chosen composition as aforesaid. Then the assembly is treated to form an arcing portion of the second metal of greater durability to arcing than the first conducting metal from which the shell is formed. In the case of the assembly of FIG. 2, the treating is in the form of hot pressing, such as hot isostatic pressing, in order to compact and fuse the powdered metal into relatively dense, substantially void free, material. Before pressing, a filling and evacuating tube 48 is used to supply the powdered material 46 to the inner volume, to remove air from that space, and to seal off the volume 44.

Figure 3:
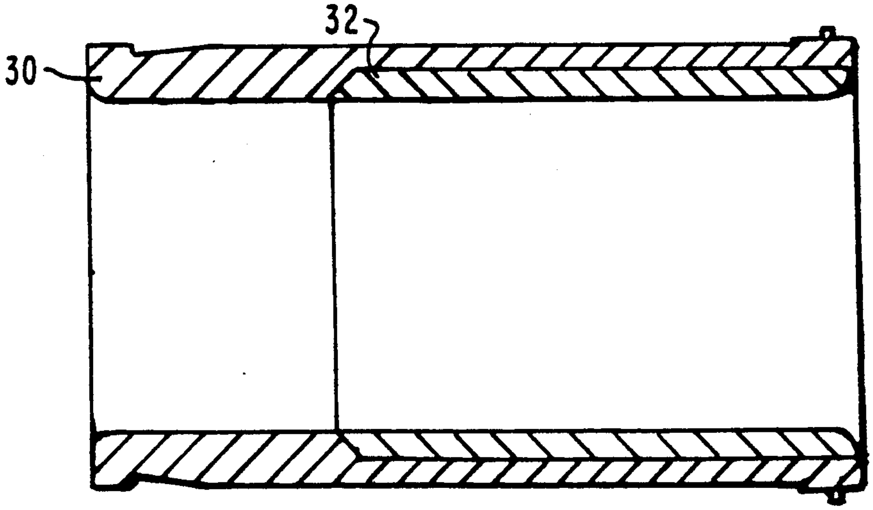
FIG. 3 is a cross-sectional view of the embodiment of FIG. 2 with its fabrication completed.

Subsequent to the performance of the pressing operation, the liner 40 and the inner surface portion of the arcing portion is machined away to a uniform diameter of the outer shell 30 and the arcing portion 32 which now is dense, fused metal, as shown in FIG. 3.

Figure 4:
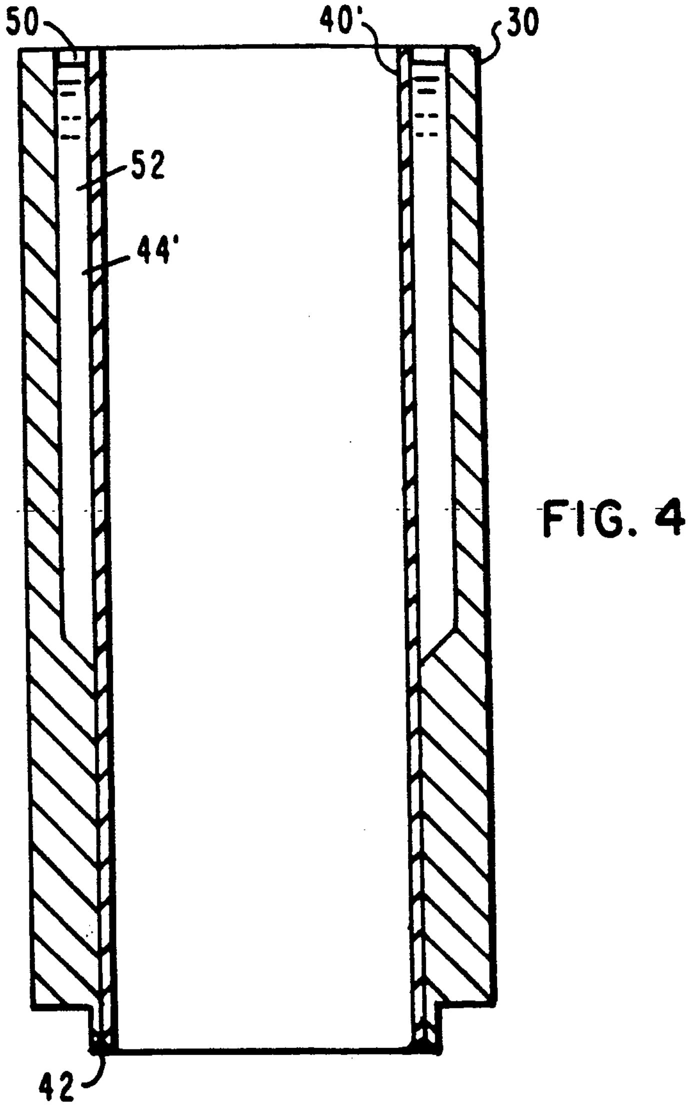
FIG. 4 is a cross-sectional view of an electrode in accordance with another embodiment of the present invention at a preliminary stage in its fabrication.

In an alternative form of the invention as shown in FIG. 4, the liner tube 40' is configured of a consistent inner diameter and is joined at just one end by a weld joint 42 to the outer shell leaving an opening 50 at the opposite end for access to the volume 44' between the liner tube and shell. The second metal, such as silver-copper alloy, is supplied to that volume 44' such as either in the form of powdered material or pieces of wire or the like and then the assembly is subjected to heating resulting in molten alloy 52 which is then cooled to form a cast layer in the proper location on the shell. After that the liner is removed and the surface smoothed.

The liner 40 in FIG. 2 is configured to allow for compaction, which is not necessary for the casting operation of FIG. 4.

In forming a cast arcing portion 32 according to the method depicted by FIG. 4 various alloy compositions may be used but it is believed favorable to use a noneutectic composition, even though the eutectic is suitable. The reason is that a non-eutectic, such as 80% Ag-20% Cu, instead of the eutectic, 72% Ag-28% Cu, is much less likely to form shrinkage voids during solidification from the molten state to the solid state.

Figure 5:
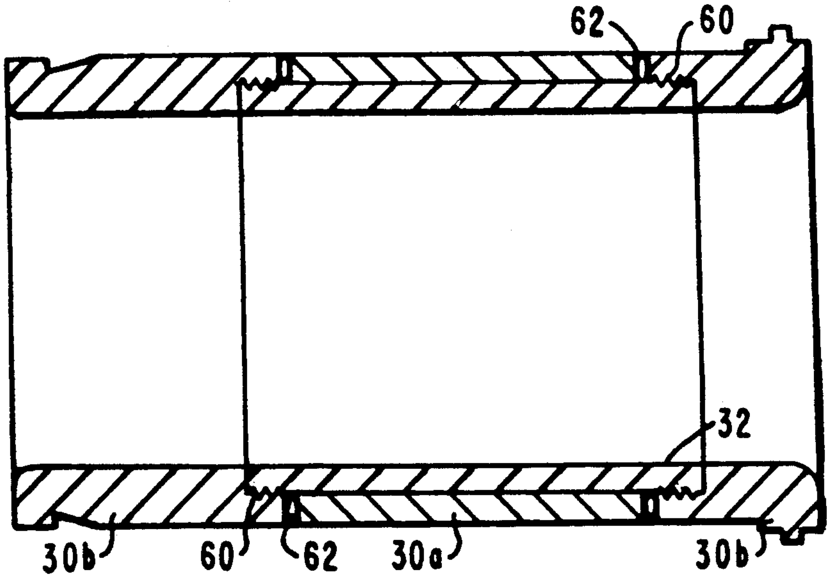
FIG. 5 is a cross-sectional view of an electrode assembly in accordance with another embodiment of the invention.

FIG. 5 shows an alternative design where the shell portion 30*a* on which the more durable arcing portion 32 is pressed or cast is joined to one or more other shell pieces 30*b* of the first metal, copper. For this purpose, the different shell sections 30*a* and 30*b* have interfitting threaded elements 60 for joining them and O-ring seals 62 at their joints. In the embodiment shown in FIG. 5, only the central section 30*a* of the outer shell is provided with the improved arcing portion 32. When the arcing on this portion reaches a wear limit, it alone need be replaced rather than the whole electrode, thus realizing additional savings.

It is therefore seen that unique processes for manufacturing plasma torch electrodes are provided that result in a substantial increase in operating life compared to conventional copper electrodes while minimizing the material cost and fabrication cost attendant to providing an arcing portion more durable than copper. From the examples given, it is believed that the inventive concepts may be practiced in still other forms as will be apparent to those skilled in the art.

We claim:

1. A plasma torch comprising:

first and second tubular electrodes arranged substantially colinearly along an axis with adjacent ends defining a gap therebetween;

means for initiating an arc across said gap;

means for supplying a gas to be heated through said gap into space within said tubular electrodes and causing the arc to extend to respective arcing portions of said electrodes' inner surfaces that are less than the entire extent of said inner surfaces;

means for rotating the arc so it moves circumferentially about said electrodes' surfaces and heats gas therebetween;

one of said electrodes being open to allow heated gas to exit the torch;

at least one of said first and second electrodes comprising a shell consisting principally of a first conductive metal and said arcing portion consisting principally of a conductive metal that is more durable than said first conductive metal under the arcing conditions of the heated gas located on an inner surface of said shell.

2. A plasma torch in accordance with claim 1 wherein:

said shell of said at least one electrode consists principally of cooper and said arcing portion thereof consists essentially of a silver-copper alloy.

3. A plasma torch in accordance with claim 1 wherein:

said at least one electrode is said first electrode operated at a high DC voltage relative to said second electrode.

4. A plasma torch in accordance with claim 1 wherein:

each of said first and second electrodes has a construction comprising a shell of a first conductive metal and said arcing portion of a conductive metal that is more durable than said first conductive metal.

5. A plasma torch in accordance with claim 2 wherein:

said silver-copper alloy consists essentially of about 72% to about 80%, by weight, silver.

6. A plasma torch in accordance with claim 5 wherein:

said alloy consists essentially of a eutectic silver-copper alloy having about 72% silver and about 28% copper.

7. A plasma torch in accordance with claim 5 wherein:

said alloy consists essentially of a non-eutectic silver-copper alloy having about 80% silver and about 20% copper.

8. A plasma torch in accordance with claim 1 wherein:

said arcing portion of more durable metal has a thickness up to about half the total thickness of the electrode including the arcing portion and shell.

9. A plasma torch in accordance with claim 3 wherein:

said first electrode is upstream relative to said second electrode which is open to allow heated gas to exit the torch.

10. A plasma torch in accordance with claim 4 wherein:

said electrodes are operated at an A.C. voltage.

11. A method of making a plasma torch electrode comprising:

providing an outer, tubular, shell of a first conductive metal;

joining an inner liner tube to said outer shell with an accessible volume therebetween;

supplying said volume with other metal of a composition differing from said first conductive metal to form an assembly;

treating said assembly to form an arcing portion of a second conductive metal of greater durability to arcing than said first conductive metal from the metal with which said volume is filled.

12. A method in accordance with claim 11 wherein: said other metal is powdered and the treating is performed by hot pressing the assembly.

13. A method in accordance with claim 12 wherein: after hot pressing said liner is removed.

14. A method in accordance with claim 13 wherein: said arcing portion is machined to the same diameter as an exposed inner surface of said outer shell.

15. A method in accordance with claim 11 wherein: the treating is performed by heating to melt the metal within the volume and then cooling the molten metal to form a cast layer.

16. A method in accordance with claim 11 wherein: said other metal consists principally of silver or a silver alloy.

17. A method in accordance with claim 11 wherein: said other metal consists essentially of a silver-copper alloy.

18. A method in accordance with claim 11 wherein: said other metal consists essentially of a silver-copper alloy having about 72% to about 80% by weight, silver.

19. A method in accordance with claim 11 wherein: said other metal consists essentially of a eutectic silver-copper alloy having about 72% silver and about 28% copper.

20. A method in accordance with claim 11 wherein: said other metal consists essentially of a noneutectic silver-copper alloy having about 80% silver and about 20% copper.

* * * * *